US006805259B2

(12) United States Patent
Stevens et al.

(10) Patent No.: US 6,805,259 B2
(45) Date of Patent: Oct. 19, 2004

(54) MEDICATION DISPENSER

(75) Inventors: Gerard Thomas Stevens, New South Wales (AU); Jonathan Anthony Salton, Bondi (AU); Dolph Allan Meyer, Cherrybrook (AU); Martin James Davidson, Newtown (AU)

(73) Assignee: Manrex Pty LTD, Mortlake (AU)

( * ) Notice: Subject to any disclaimer, the term of this patent is extended or adjusted under 35 U.S.C. 154(b) by 184 days.

(21) Appl. No.: 10/258,051

(22) PCT Filed: Jun. 1, 2001

(86) PCT No.: PCT/AU01/00651

§ 371 (c)(1),
(2), (4) Date: Oct. 17, 2002

(87) PCT Pub. No.: WO01/94205

PCT Pub. Date: Dec. 13, 2001

(65) Prior Publication Data

US 2003/0057230 A1 Mar. 27, 2003

Related U.S. Application Data

(60) Provisional application No. 60/246,618, filed on Nov. 7, 2000.

(30) Foreign Application Priority Data

Jun. 5, 2000 (AU) ........................................... PQ 7592
Aug. 3, 2000 (AU) ........................................... PQ 9145

(51) Int. Cl.[7] ............................................. B65G 59/00
(52) U.S. Cl. ....................... 221/124; 221/130; 221/200; 221/236; 198/757

(58) Field of Search ................................ 221/124, 129, 221/130, 133, 200, 236, 239, 263, 224; 198/752.1, 756, 757

(56) References Cited

U.S. PATENT DOCUMENTS

| | | | | | |
|---|---|---|---|---|---|
| 4,807,757 | A | * | 2/1989 | Rappaport et al. | 206/535 |
| 5,152,422 | A | * | 10/1992 | Springer | 221/2 |
| 5,269,440 | A | * | 12/1993 | Bohnert et al. | 221/200 |
| 5,444,749 | A | * | 8/1995 | Nambu | 377/6 |
| 6,481,180 | B1 | * | 11/2002 | Takahashi et al. | 53/237 |
| 6,510,668 | B2 | * | 1/2003 | Kim | 53/154 |
| 6,581,356 | B2 | * | 6/2003 | Kim | 53/154 |
| 6,585,132 | B2 | * | 7/2003 | Kim | 221/133 |

* cited by examiner

*Primary Examiner*—Richard Ridley
(74) *Attorney, Agent, or Firm*—Smith-Hill and Bedell

(57) ABSTRACT

A medication tablet dispenser has an upright casing providing a tower which is subdivided by horizontal partitions into eight compartments which individually contain removable holders each containing a charge of tablets to be dispensed. The holders have framing portions which together provide a funnel opening downwardly into a cavity of a blister sheet. The casing is vibrated back and forth about its vertical axis through a small angle to cause tablets in the holders to progress towards an outlet leading into the funnel and having an associated ejector which discharges selected tablets into the funnel when required by a computer program. Conical vibration of the casing is prevented by a connection located on its vertical axis and held stationary by a fixed arm. The ejectors operate in response to slide-rods individually reciprocated by associated solenoids controlled by the computer program.

20 Claims, 11 Drawing Sheets

MEDICATION DISPENSER

CROSS-REFERENCE TO RELATED APPLICATION

This application claims benefit of Provisional Application No. 60/246,618 filed Nov. 7, 2000.

FIELD OF THE INVENTION

THIS INVENTION relates to the pharmaceutical industry and is more specifically concerned with packaging medication for patients who are required to take a number of different medications in tablet or capsule form. Medication in tablet, capsule or similar non-liquid form will hereinafter be referred to as a dose.

STATE OF THE ART

Medication doses may vary in type and number over the daily period. Patients are often confused as to what type and number of doses they are required to take at a particular time, at what time the doses are to be taken, and finally having to recall whether they have already taken the prescribed doses for a particular time.

One method devised for overcoming this problem is to provide the patient with a pack containing an array of receptacles such as cups or blisters each corresponding to a particular time at which a number of doses are to be taken on a particular day, and arranging for a pharmacist to fill the cups or blisters of the pack with the correct doses as determined by a doctor's prescription. For convenience such a pack is referred to hereinafter as a "dose pack". This involves a qualified chemist sitting down and laboriously dispensing the doses by hand into the individual cups or blisters of the pack. Bearing in mind that there may be up to twelve different types of dose to be taken over a period of one week—which is the normal interval covered by a typical pack—a substantial part of the pharmacists time is involved in filling packs rather than in attending to other duties he is required to perform as a pharmacist. An analogous problem arises when a pharmacist is required to provide a receptacle, such as a blister, with a number of different doses which a patient is to take at different times over an extended period such as a week. The hand-filling of the receptacle with the correct quantities of the different doses is both laborious and time-consuming.

OBJECT OF THE INVENTION

An object of this invention is to enable doses to be loaded more quickly.

THE INVENTION

In accordance with the broadest aspect of this invention apparatus for dispensing medication doses, comprises: a tower of dose holders placed one above the other and respectively for storing different doses which are to be dispensed; a device for vibrating the tower in a predetermined manner to move the doses in the holders towards outlets provided therein; ejectors individually associated with the holders and operable to release required doses from the outlets of the holders; an open-ended collector into which the doses ejected from the holders fall; a loading station disposed beneath the open lower end of the collector and for supporting a receptacle which is to be loaded with a selected number of different doses ejected from the holders; and a controller operated in accordance with a predetermined dose-loading programme and governing the operation of the ejectors.

In accordance with a narrower aspect of the invention apparatus for dispensing medication doses into a pack, comprises: a tower of separable superimposed and similar holders for respectively storing different doses which are to be dispensed; a device for vibrating the tower in a predetermined manner; a guide in each holder for responding to the vibrations of the tower by conveying the doses in the holders individually towards holder outlets having associated dose ejectors; a collector for receiving the doses ejected from the holders and discharging them towards a position at which a receptacle of a horizontally arranged array of receptacles is to be located; a support for holding the array of receptacles at a dose-loading location; a mechanism for producing a relative horizontal displacement between the support and the discharge end of the collector to enable the individual receptacles to be loaded with the desired combinations of doses; and, a controller operated in accordance with a predetermined dose-loading program and governing the operation of the ejectors and the relative movement between the collector and the support to enable the array of receptacles to be loaded in an automated manner with the desired combinations of doses as determined by the program. The receptacles may be blisters of a blister sheet for example, or separate cups. Once the receptacles have all been loaded, they can be hermetically sealed to provide a sheet of receptacles.

A pharmacist using the apparatus may construct the tower from holders each of which contains a set of doses. Thus if the receptacles to be loaded require eight different doses, the tower will have eight holders each containing one of the different doses.

OPTIONAL FEATURES OF THE INVENTION

Preferably the holders take the form of hollow, shallow cylindrical boxes each internally formed with an upwardly spiralling guide leading from the interior of the holder towards an outlet. Striations or ridges may be provided on the floor of the guide and the holder to facilitate the movement of the doses progressively towards the side and up the guide as the holder is vibrated.

Conveniently the tower is mounted on a base which is vibrated horizontally through a small arc by the device. The arc may be a degree or so long about the tower axis and is produced by a vibrator operating at, for example, 50 Hz. The arcuate velocity of the vibration is preferably greater in one direction than the other. The holders are so mounted that the vibration applied to the lowermost holder is transferred with very little attenuation upwardly through all of the holders of the tower. It is preferred that the center of the top of the tower is held on the upright longitudinal axis of the tower to prevent arcuate vibration of the upper holders along a conical path around the tower axis. The prevention of conical vibratory movement of the upper end-portion of the tower significantly increases the speed at which the doses advance up the guides towards the holder outlets.

In one arrangement of holder, a dose elector may be mounted in one side wail and, until operated, maintains the holder closed to prevent the entry of dust and particles into It from the ambient air. The ejector may be provided with a replacement element which is shaped to eject a particular shape and size of dose stored in the holder.

INTRODUCTION TO THE DRAWINGS

The invention will now be described in more detail, by way of examples only, with reference to the accompanying diagrammatic drawings, in which:

IN THE DRAWINGS

DESCRIPTION OF FIRST EMBODIMENT

Figure 1:
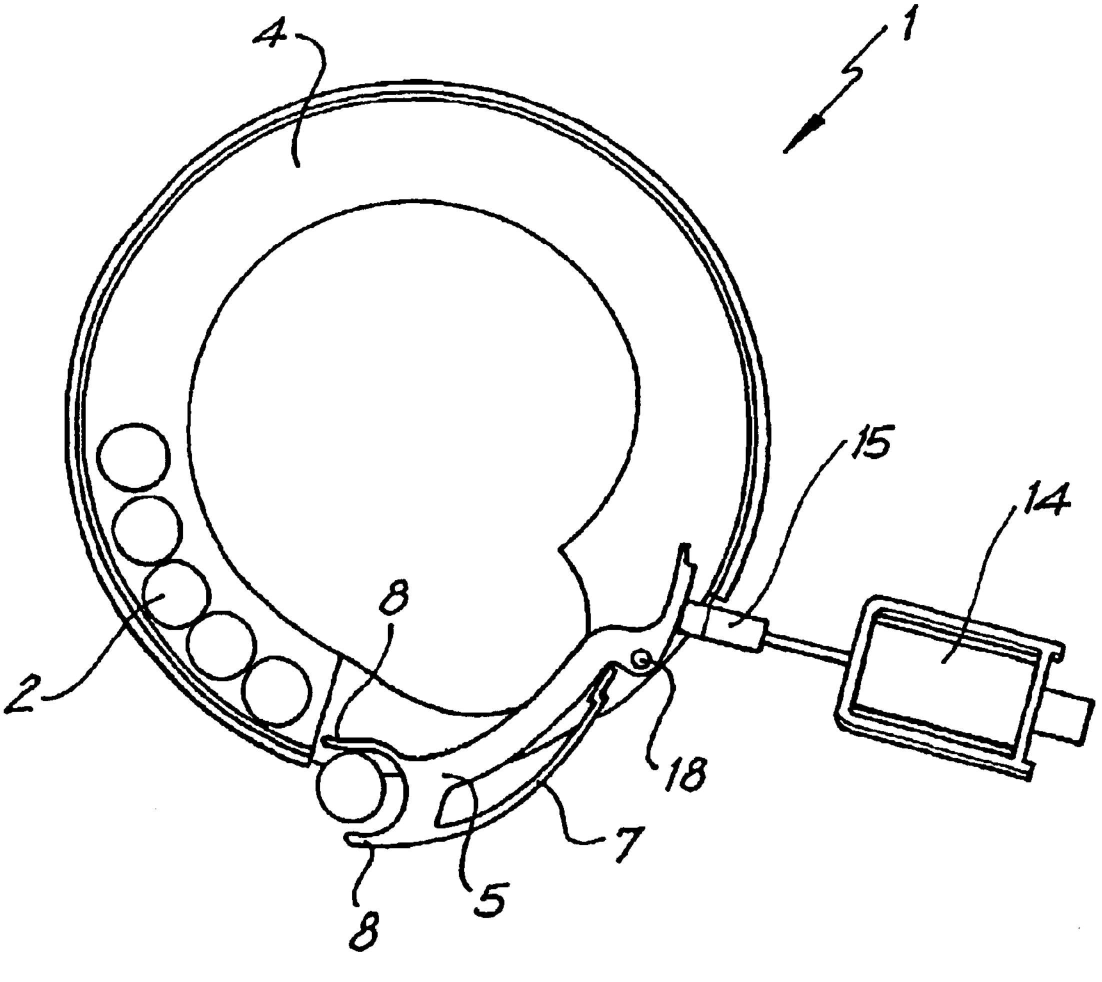
FIG. 1 is a cross-section through a holder and shows an ejector removing a dose from the holder in response to operation of an associated actuator.
Figure 2:
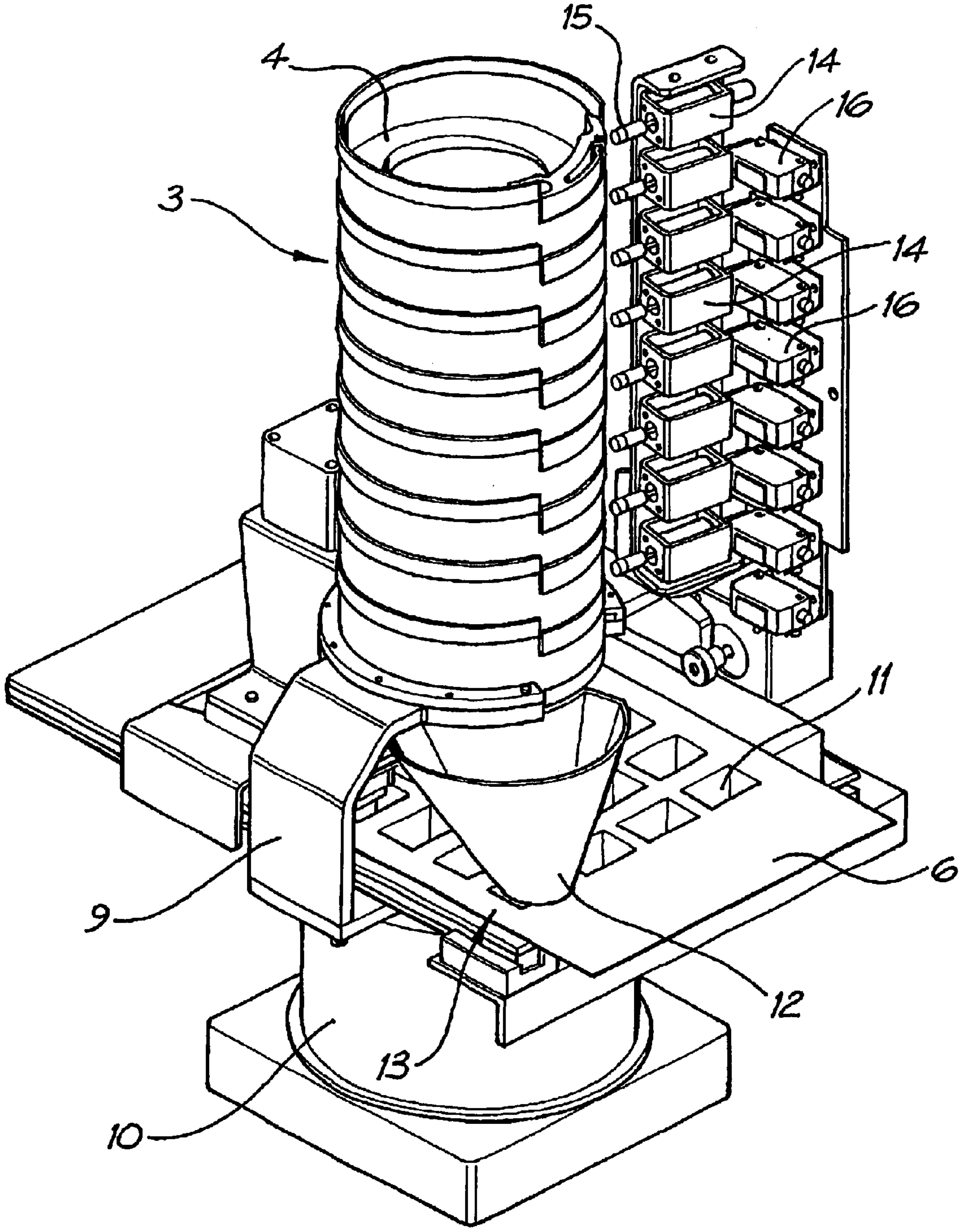
FIG. 2 is a perspective view of apparatus for dispensing doses into a blister pack and having a tower of holders of the form shown in FIG. 1.

FIG. 2 shows a tower 3 composed of seven closed holders 1 and one, topmost open holder 1 each of which is internally provided with an upwardly spiralling internal track 4 arranged around the Inside surface of its outside wall. The topmost holder 1 is shown open to display its interior. As shown FIG. 1, each of the holders is provided with an ejector mechanism 5 arranging its side-wall and mounted on a vertical pivot 18. The ejector 5 has a socket formed between a pair of horns 8 at one end and is biased towards the position shown in FIG. 2 at which it effectively closes an outlet from the holder 1. The ejector has a tail 19 shown in FIG. 1 and capable of being engaged by an actuator piston 15 to move the socket of the ejector from a position shown in FIG. 1 and at which it is aligned with the upper end of the spiral guide 4, to the position shown in FIGS. 2 and 3 at which a tablet vibrated into the socket can be ejected down the side of the tower by pivotal movement of the ejector 5 about pivot 18. The floor of the holder 1 and the spiral guide 4 are provided with shallow ridges or striations to engage the undersides of the tablets or doses so that, as the holder vibrates arcuately through a small angle of between a half and one degree about its axis the doses travel progressively up the guide 4 towards the outlet and thus towards the ejector.

The individual holders 1 are coupled to one another in the tower in a way which prevents arcuate slipping between them. A bayonet fastening (not shown) may be used for this purpose. However, other forms of fastening are equally useful to ensure that the axes of the holders remain substantially vertical and aligned and the vibratory movement imparted to the lowermost holder 1 is transferred, without attenuation, to the uppermost holder 1.

Figure 3:
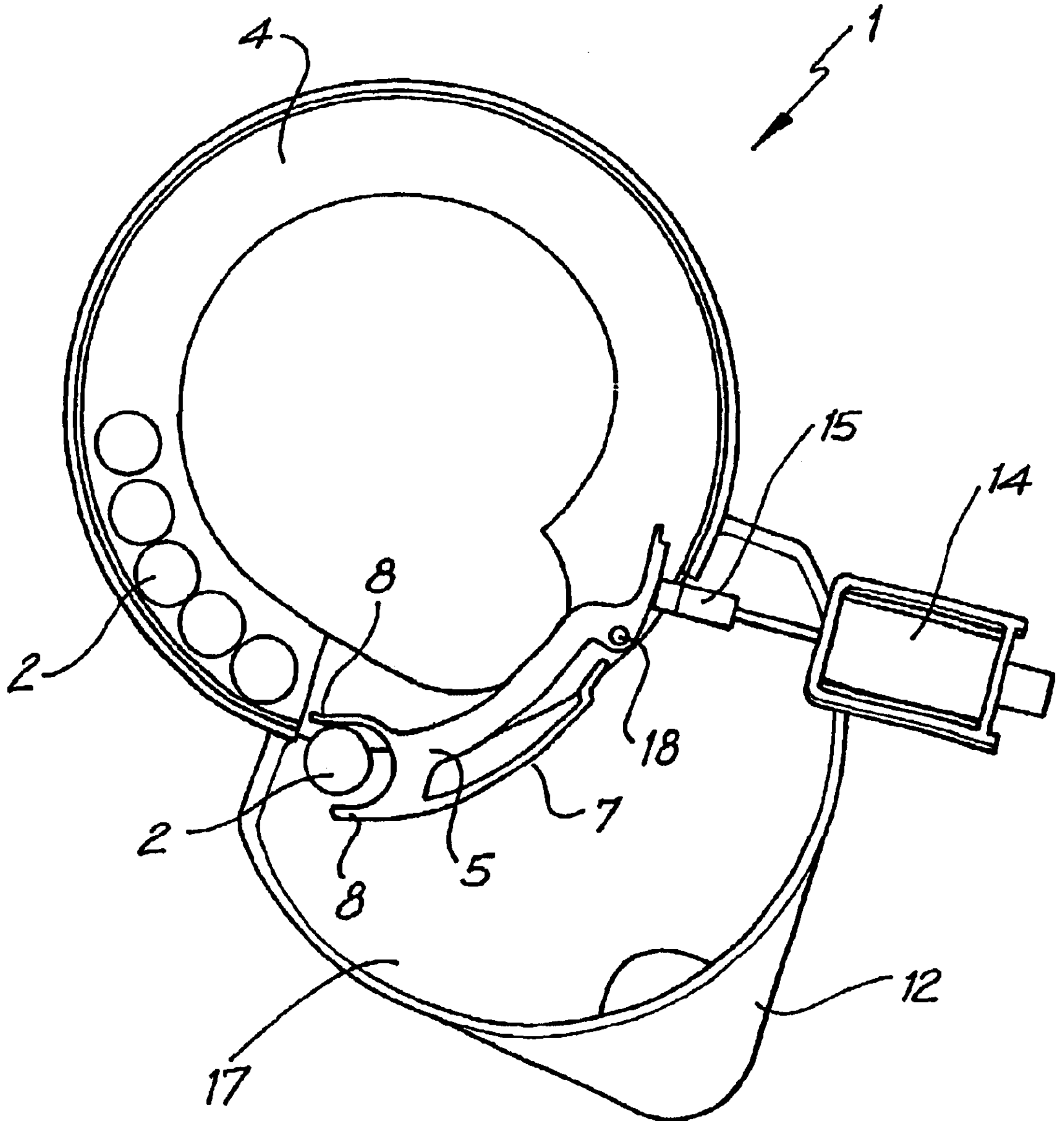
FIG. 3 shows the position of a funnel collector into which drop doses ejected from the various holders of the tower of FIG. 2.

As shown in FIGS. 2 and 3, a funnel collector 12 is arranged to one side of the lower end of the lower in order to collect the individual tablets or doses ejected from the holders 1 and subsequently distribute them to the appropriate blister. The lower, open discharge end of the collector is arranged above a support 13 in the form of a horizontal platen 6 formed with a rectinear array of pockets 11 for receiving respective blisters of a blister sheet (not shown) which is placed on top of the platen 6 when it is to be loaded with tablets or doses. Separate receptacles such as cups may be used in place of the blisters if desired. The platen 13 can be moved horizontally along perpendicular axes to bring any particular blister of the sheet beneath the lower discharge end of the funnel collector 12 so that it can be loaded with the required prescribed doses. The funnel collector 12 may also be moved about the axis of the tower if required, so that the relative movement between the collector 12 and the platen 6 brings a particular blister to be loaded, precisely beneath the lower open end of the funnel collector 12.

The funnel collector 12 and the tower of holders 1 are carried by a bridge-piece 9 which is vibrated arcuately through about one degree horizontally about the vertical axis of the tower, by means of a vibrator mechanism 10 located beneath the platen 6. The vibrator 10 is able to have its amplitude of vibration adjusted and vibrates slower in one direction than in the other. This causes the tablets or doses to ascend up the spiral guide 4 so that one of them locates between the horns 8 of the ejector as shown in FIG. 1. If the associated actuator 15 is operated by one of a vertical column of solenoids 14 arranged alongside the tower, the associated ejector 5 turns about the pivot 12 and the dose trapped between its horns 8 is ejected from the side of the holder and falls into the funnel 12 beneath. The funnel 12 may be lined with a replaceable paper to prevent cross-contamination between the different doses which may be loaded a different times.

A vertical line of photo-electric sensors 16 associated with respective holders 1 as shown in FIG. 2, detects the ejection of each tablet or dose from the associated holder 1. However, if preferred, a single photo-electric sensor may be positioned at the level of the collector 12 to detect the downward descent of each of the selected doses through the collector to the blister beneath. Such a single photo-electric sensor takes the place of the vertical line of sensors 16 mentioned above.

A computerised loading program controls the operation of the actuators 15 and takes appropriate action if the operation of a particular ejector does not result in a dose being ejected from the associated holder. Likewise the program controls the relative movement between the lower end of the funnel collector 12 and the platen 6 to ensure that each blister-loading sequence is carried out completely, before the next-blister to be loaded is located beneath the funnel collector 12. In the preferred dose-loading sequence, a failure of an ejector to release a particular dose from a holder results in the ejector being reactivated a number of times, say three, in quick succession. This usually results in the required dose being released. However, if it is not, the dose-loading sequence is continued to its end and the software records that a particular holder is not releasing doses. At the end of the dose-loading sequence a second attempt is automatically made to release a dose or doses from the holder which previously malfunctioned. If this second attempt also fails, the operator is warned that loading of the doses is incomplete as a particular dose has not been released. The operator can then add the missing doses by hand to the blisters and check the holder as it has probably emptied prematurely. In the unlikely event that the ejector of the holder has somehow jammed, this can be cleared by the operator when loading is completed.

In a modification of the tower 3 not illustrated, each of the holders 1 has a lid provided in its center with a part-hemispherical depression. An L-shaped robust arm of extendible length extends up one side of the tower and is attached at its lowered to the bridge piece 9 and its upper end extends diametrically across the top of the tower. A locating ball is provided in the underside of the upper end of the arm and locates in the part-hemispherical depression. The upper end of the tower is thus held in axial alignment with the lower end so that it is prevented from moving conically around the axis of the tower 3 when the tower is vibrated. This greatly increases the speed of movement of the doses up the spiral guide 4.

The above-described apparatus is capable of halving the time taken to load a blister sheet. This represents a substantial saving of the pharmacist's time.

DESCRIPTION OF SECOND EMBODIMENT

Figure 4:
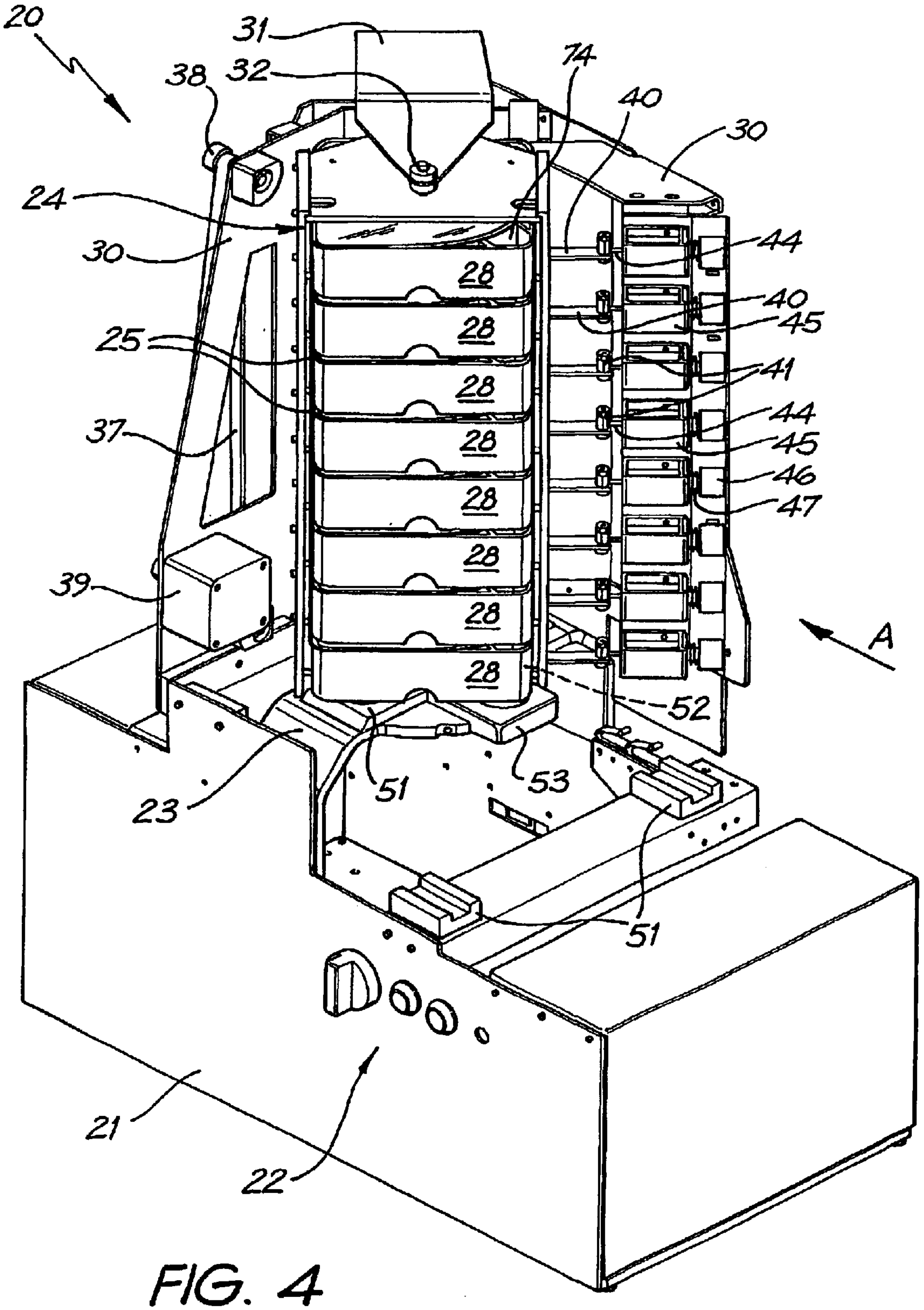
FIG. 4 is a perspective view of a second form of dispenser utilising a different construction of tower.
Figure 5:
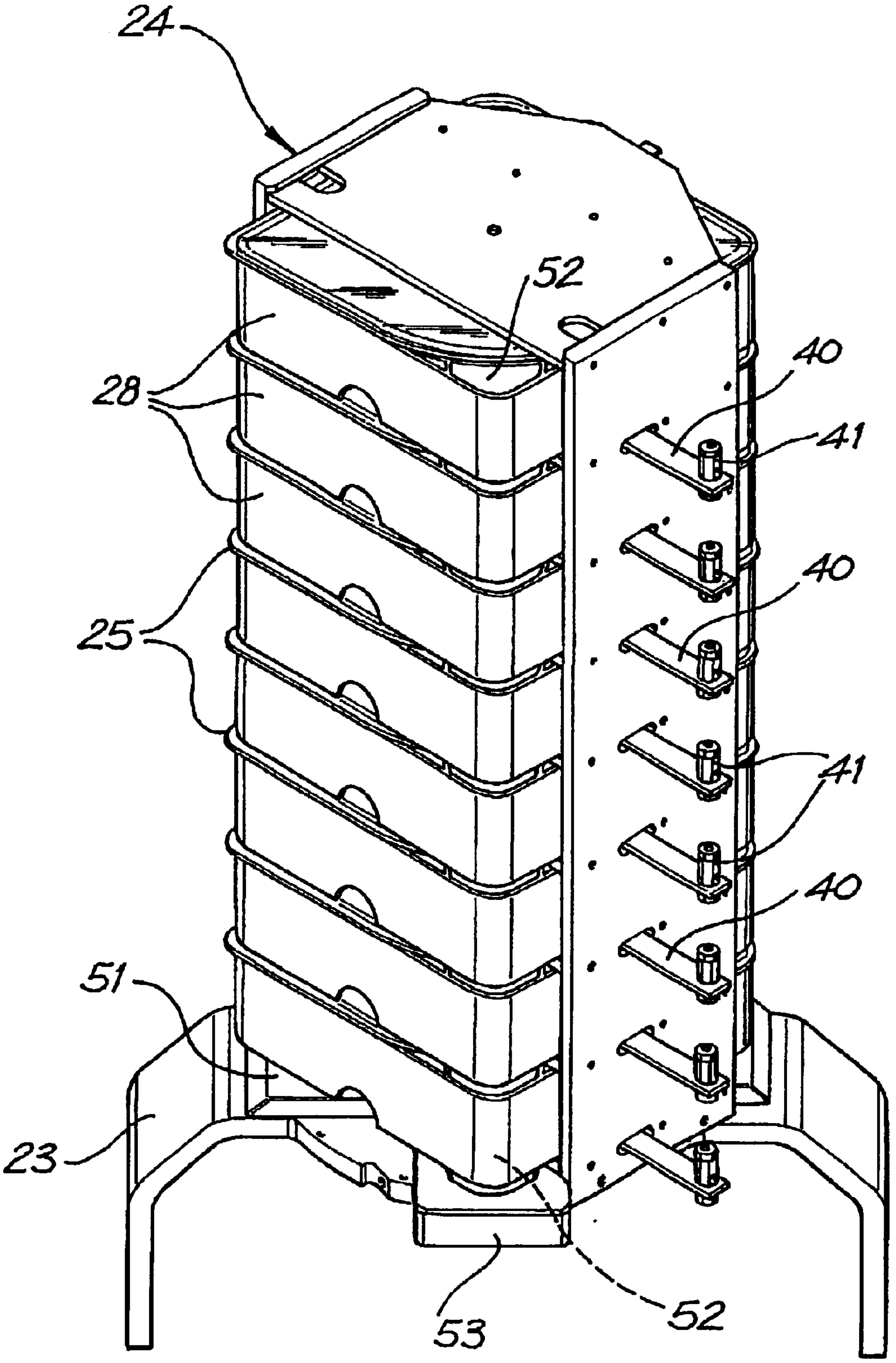
FIG. 5 is a perspective view of a stack of holders arranged in individual compartments of the tower of FIG. 4.

FIGS. 4 and 5 show partly broken away, portions of a tablet dispenser 20 having a base 21 in which is mounted electronic control equipment and a vibrator (not shown) for operating the dispenser. Manual controls and lamps 22 are mounted on one side of the base 21 to assist the operator using the dispenser 21.

Figure 6:
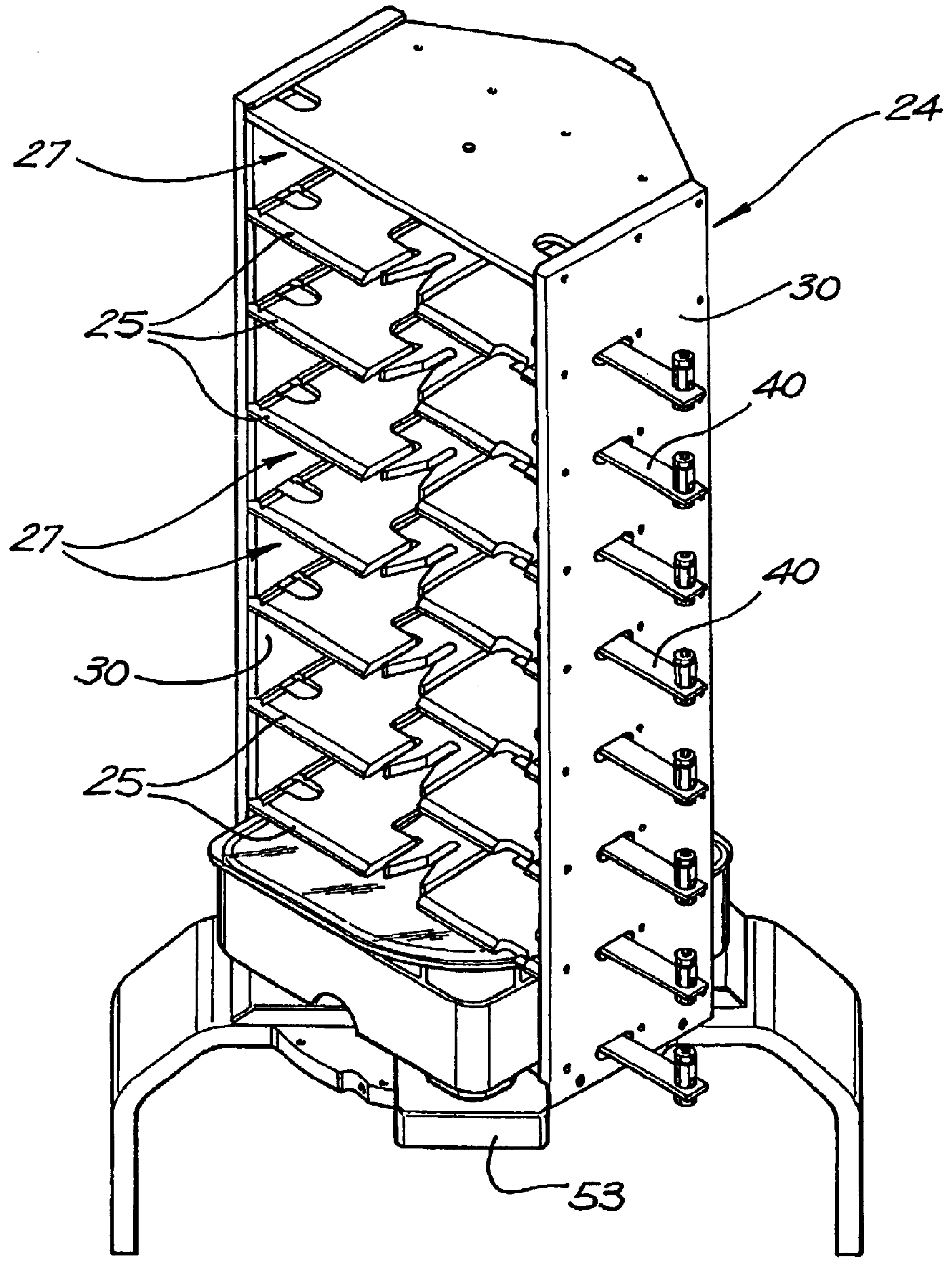
FIG. 6 is a view of the tower of FIG. 5 after removal of all except the lowermost holder from their respective compartments.

A bridge piece 23 is mounted on a vibrating mechanism (not shown) which operates to vibrate the bridge piece along a horizontal arc through a few degrees about the axis of a vertical tower casing 24. The casing 24 is divided by horizontal partitions 25, shown more clearly in FIG. 6, into a vertical stack of compartments 27 each of which can positively locate a tablet holder 28 shown in FIG. 5. The holder 28 is closed by a lid (not shown) which can be removed to enable the holder to be replenished with medication doses, such as tablets, capsules or caplets. The actual form which the dose takes is immaterial, provided its size and characteristics enable it to be mechanically dispensed by the dispenser.

As shown in FIG. 4, the tower casing 24 is flanked by stiff, robust vertical mounting plates on which are mounted various items of equipment which operate in conjunction with the tower casing 24 to ensure tablets are dispensed quickly and in the correct number from the holders 28. The plates 30 do not participate in the vibration of the tower casing 24. They are rigidly attached at their lower ends to the fixed base 21. The plates 30 support at their upper ends a slabilising arm 31 which extends horizontally across the top of the tower casing 24 and is fixed to the casing 24 by a connector 32 which allows the casing to vibrate horizontally through a small arcuate angle about its vertical axis While holding the upper end of the tower axis against conical vibratory movement. As has previously been stated, unless the upper end of the tower casing 24 is restrained against conical vibratory movement, the tower is less effective in transporting the doses towards discharge outlets of the holders 28.

Figure 12:
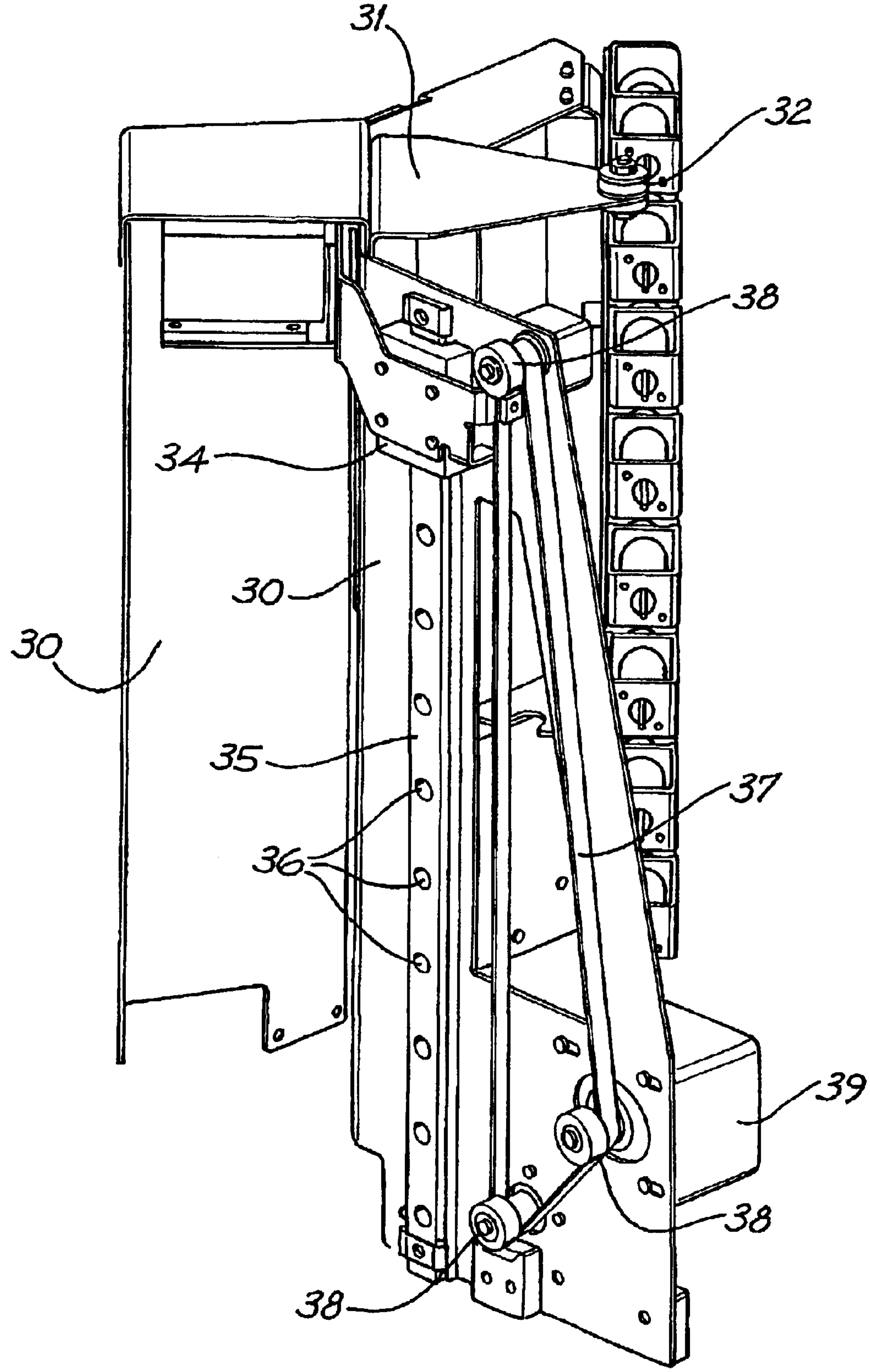

As shown in FIGS. 4 and 12, a bar-code reader 34 is moveable along a vertical slide rail 35 which is provided with spaced windows 36 at the positions of respective holders 28 mounted in the compartments of the tower casing. The rail 35 is mounted on one of the side plates and its vertical position is altered by a drive belt 37 running around pulleys 38 one of which is driven by an electric motor 39 operated by the equipment on the base 21 in accordance with a pre-arranged dose-loading programme.

Figure 9:
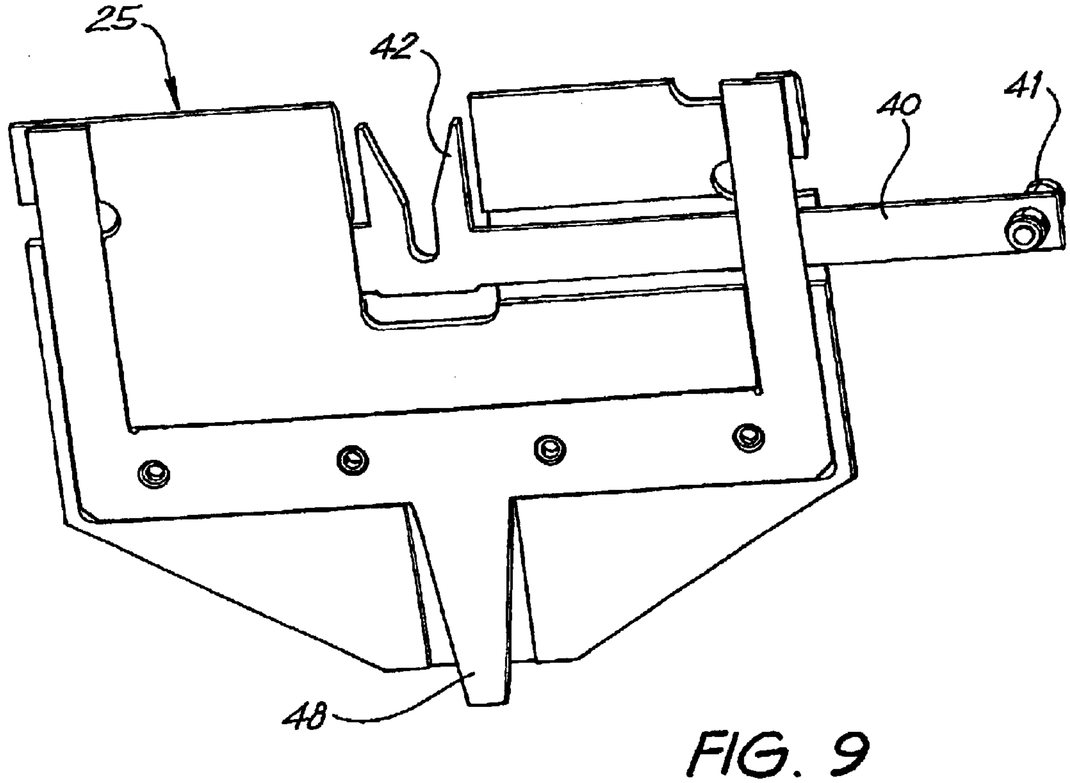
FIG. 9 is an under plan view of a shelf forming the floor of holder compartment of the tower.
Figure 10:
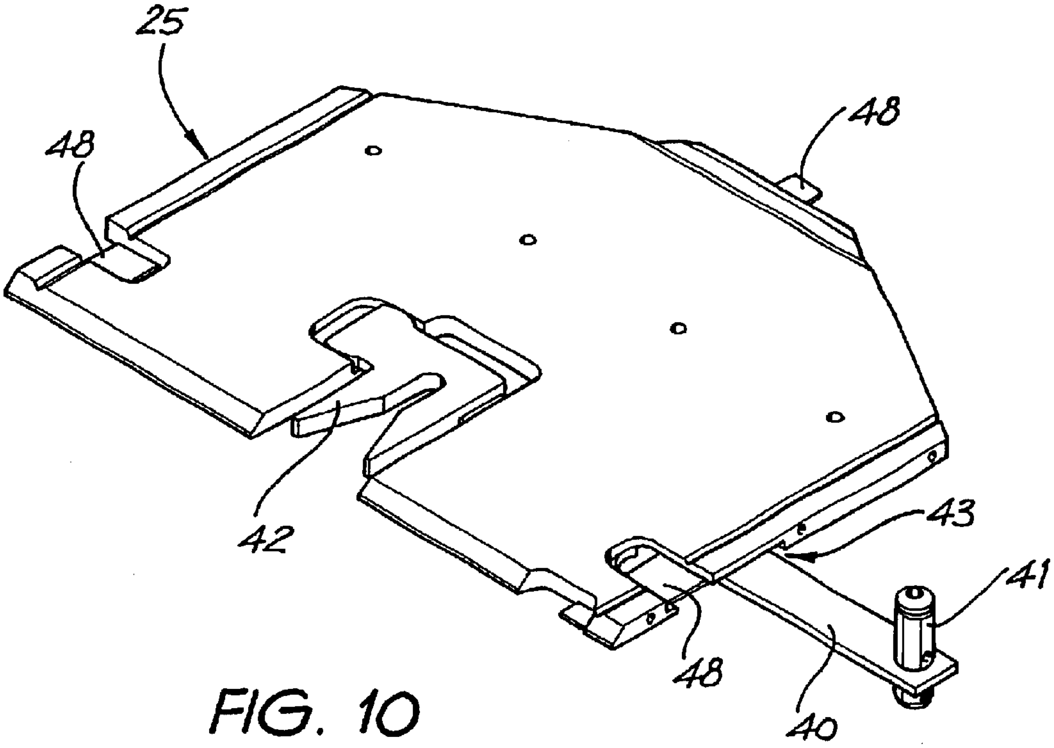
FIG. 10 is a top plan view of the shelf of FIG. 9.

Reverting again to FIGS. 5 and 6, each of the floor partitions 25 of the compartments 27 has an associated push-rod 40 which extends through one of the side plates 36 and carries a stud 41 at its outer end, and a fork 42 at its inner end as is clearly shown in FIG. 9. The push-rod is guided by a channel 43 formed in the underside of the partition 25 and along which it can be reciprocated by a solenoid-operated piston 44, shown in FIG. 4, which engages the stud 41 and has an associated driver solenoid 45. The piston extends through the solenoid 45 and has a head 46 at its outer end which is urged into a retracted position by a coil spring 47.

A Y-shaped flat steel spring 48 is riveted to the underside of each of the floor partitions 25 and serves to locate positively the upper face of the holder when fitted Into a compartment. Ridges (not shown) cooperating with grooves on the holder also serve to assist correct location of the holder in the compartment so that a person loading a holder into the compartment detects positively a correct fit of the holder when It is properly located in its compartment.

The base 21 is provided with guides 51 to constrain movement of a platen which is to support a blister sheet to be loaded with medication dose to a horizontal reciprocating movement beneath the tower casing 24, similarly to the platen 6 of the first embodiment. It will therefore not be again described.

The tower casing 24 rests on a platform 51 supported by the bridge piece. A lower end of a funnel 52 beneath the tower can be horizontally indexed through predetermined angles to bring it into alignment with the position of a particular row of blisters to enable each, in turn, to be loaded with prescribed medication doses. A dose-sensing element 53 at the lower end of the funnel 52 has an associated photo-electric optical device (not shown) which detects the presence of a medication dose free-failing past it and sends a signal to software controlling the blister-loading sequence to signify that a particular ejected dose has been released into the blister positioned beneath the funnel 52.

Figure 11:
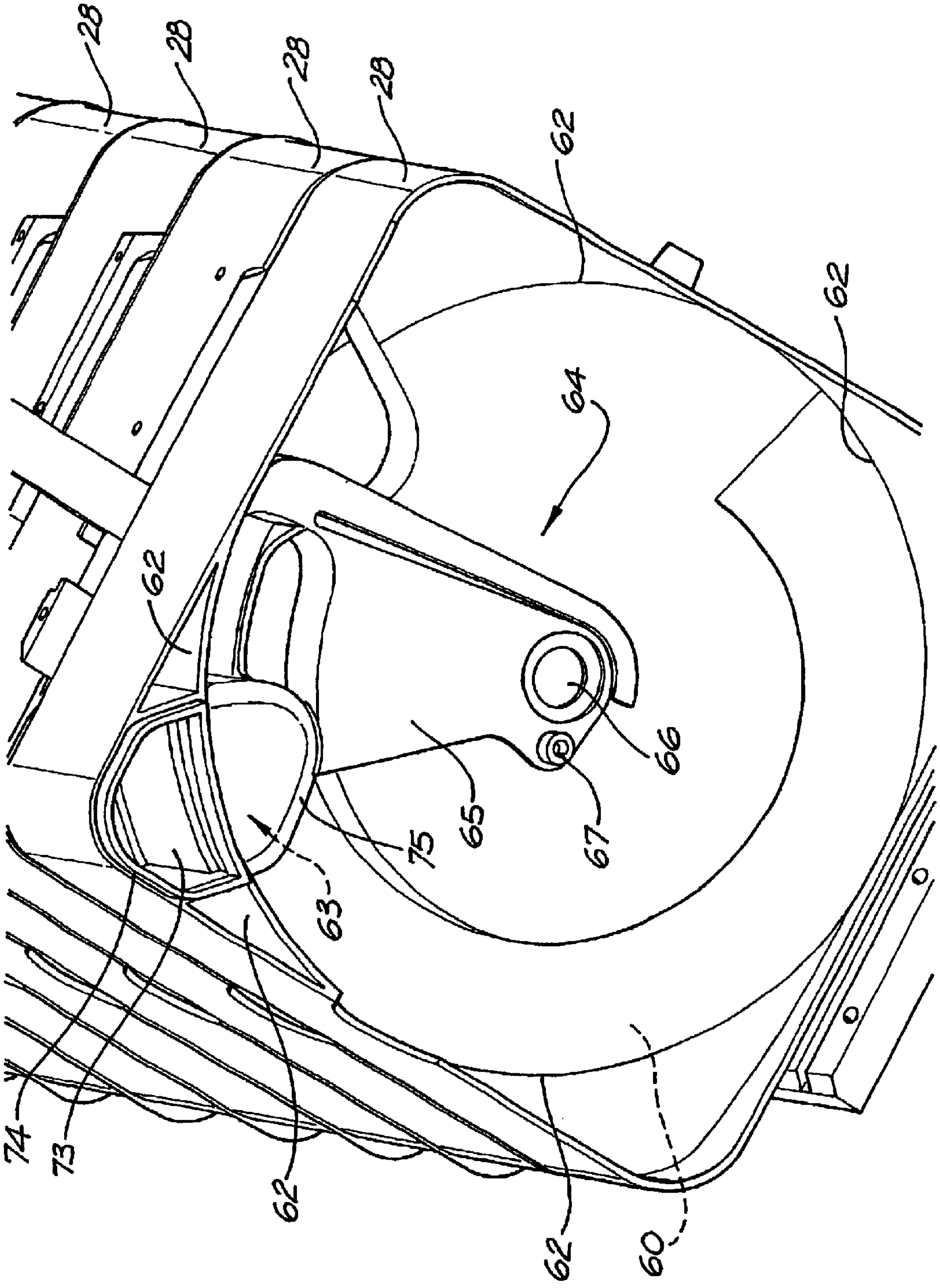
FIG. 11 is a perspective under view of an ejector of a holder in its dose-ejecting position; and, FIG. 12 shows a bar-code reader used in conjunction with the tower.

One of the holders 28 will now be described in more detail with reference to FIGS. 7, 8 and 11.

The holder 28 is preferably made from transparent plastics material and has a plastics removable lid (not shown). It is of generally rectangular shape in plan, with rounded comers as shown in FIG. 7. It has an Internal spiral ramp surface 60 which ascends up its inside wall. The center of spiral provides a well 61 in which a charge of medication doses is placed. The outside surface of the spiral ramp is provided by a circular wall 62 which guides the tablets or doses up the ramp as the holder is vibrated. Striations (not shown) on the floor of the ramp 60, coupled with the arcuate vibrational movement of the holder 28 vibrating at different arcuate speeds in opposite directions respectively, cause the doses to ascend progressively up the surface of the ramp 60. Close to the top of the ramp a dose will drop into a pocket 63 forming part of a dose ejector 64 shown in detail in FIGS. 8, 9 and 11. A deflector surface (not shown) on a downward protuberance (also not shown) formed on the underside of the lid of the holder 28, allows a single file of doses to advance beneath it towards the pocket 63. If one dose is resting on another, or is tilted on edge, it is deflected by the protuberance surface back into the well 61 and cannot pass beneath the protuberance.

The ejector 64 comprises a plastics lever 65 pivoted at 66 to the center of the underside of the holder 28. An eccentric pin 67 adjacent the pivot 66 engages between the two tines 69 of the fork when the holder 28 is inserted correctly into its compartment. Reciprocation of the slide rod 40 produced by energisation of the solenoid 45, causes the lever 65 to rock about the pivot 66.

Figure 7:
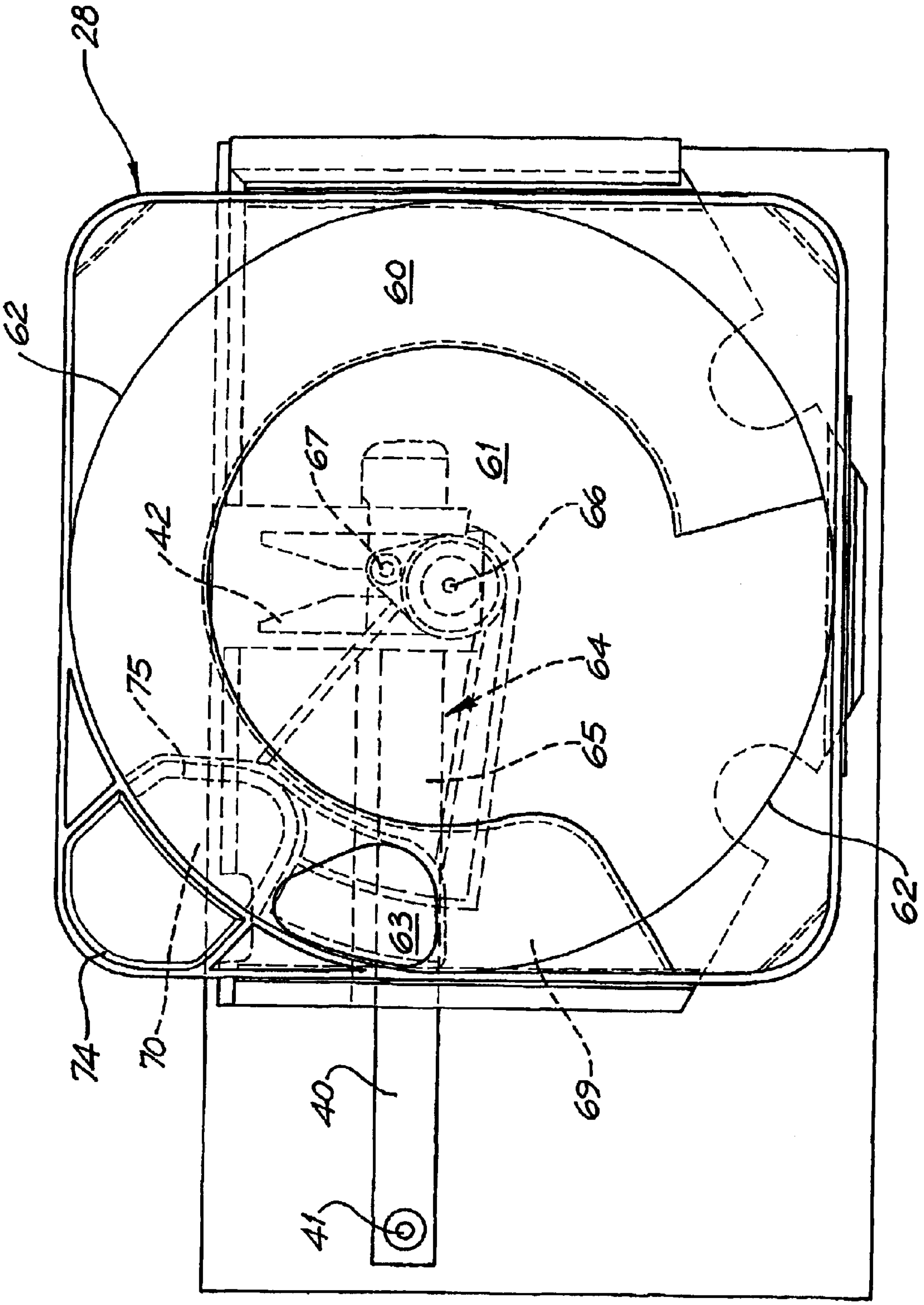
FIG. 7 is a plan view of a holder in its mounted position in a compartment of the tower and shows, in phantom, the operative connections between an ejector mechanism of the holder and a reciprocating actuator which controls the release of a tablet or dose from the holder.
Figure 8:
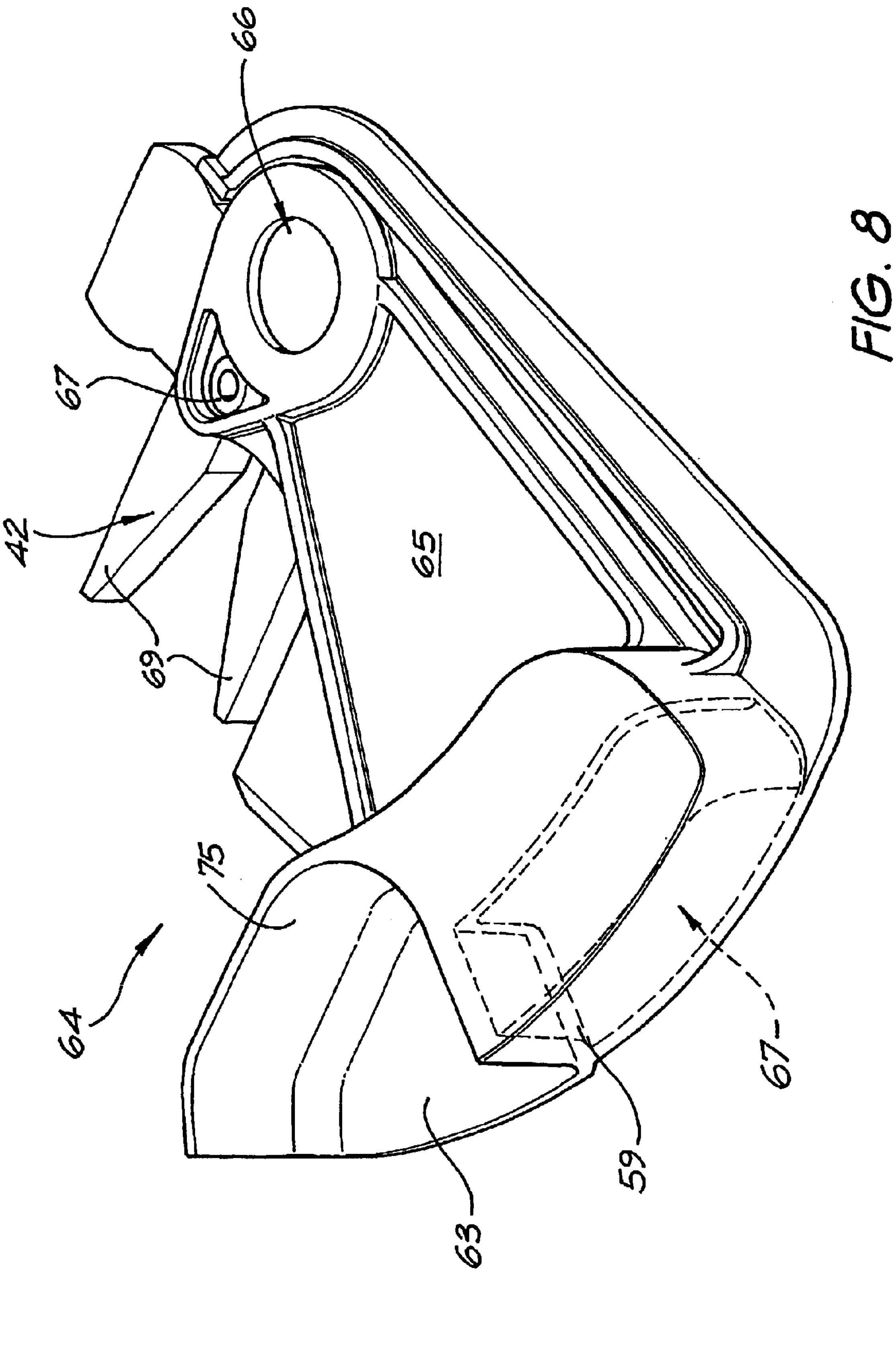
FIG. 8 is a perspective view, to an enlarged scale, of the ejector mechanism in the holder.

The lever is provided at its free end-portion with an arcuate block 67, shown in FIG. 8, which extends upwards into an arcuate recess 68 shown in FIG. 7, provided in the marginal edge-portion of the holder 28 beneath the elevated end-portion of the ramp 60. The block 67 is formed with a curved outer face 59 which is complementary to, and extends alongside the inside surface of the wall 62, so that limited movement of the lever about its pivot 66 can be accommodated by movement of the block 67 along the wall 62 and Into an arcuate cavity 70 located beneath the upper surface of the elevated portion of the ramp 60. The pocket 63 in the block 67, is open-sided, the pocket opening outwardly against the surface of the wall 62. An ejection opening 73 is provided in the wall 62 and leads into the interior of a frame portion 74 of the holder 28. The frame portion 74 is in vertical registration with corresponding similar frame portions 74 of the other holders 28 of the tower, so that the superimposed frame portions 74 provide the vertical enclosed funnel 52 extending vertically down one side of the tower as shown in FIG. 4. The pocket 71 is shaped to accommodate one dose of medication at a time, and has a sloping side face 75 which bears against the dose as the pocket approaches the position of the election opening 73 and, as a result of the in ertia of the dose, the side face 75 causes the dose to be ejected by way of the ejection opening 73 at the side of the cavity.

When the block travels into the cavity 74, it moves in a direction opposite to that of the doses travelling up the spiral ramp 60. It can sometimes happen that a dose is not totally within the confines of the pocket 63 when the slide rod 40 is operated. It may then jam between the end of the ramp 60 and the end of the pocket 63. The possibility of such an occurrence is allowed for by the presence of the spring 47 shown in FIG. 4. The electronic control of the dispenser allows the solenoid 45 controlling the ejection of a particular dose to operate several limes in quick succession. After each operation of the solenoid, the block 67 returns to its starting position. The floor of the pocket 63 slopes gently upwards at its trailing side so that a dose which has inadvertently positioned itself where it jams forward movement of the block 67, slides upwardly out of the pocket 63 and back into the interior of the holder. This allows another dose to enter the now-empty pocket 71 from the spiral ramp 60.

Operation of the Second Embodiment

A pharmacist loads the compartments 27 of the tower 24 with eight closed dose holders 28. Each dose holder has a bar-code identifying its contents. The pharmacist also enters in the dispenser, details of a prescription provided by a doctor and which identifies the patient and the medication doses the patient is required to take at each of a number of times a day. A blister sheet having columns of blisters corresponding to the times at which medication is to be administered, and arranged in rows corresponding to the seven days of the week, is placed on the loading platen of the dispenser as described with reference to the platen 6 in first embodiment described above. The blisters have in their cavities exposed upwardly so that they can be Individually loaded one-by-one, by the dispenser.

The pharmacist switches the dispenser on. The bar-code reader 34 travels up the tower and notes in the dispenser software the positions of the various holders 28 as given by their bar-codes which are successively read as the reader 34 travels up the tower.

The arcuate horizontal vibration of the tower when the dispenser is switched on, causes the medication doses in all of the holders to travel up their respective ramp surfaces 60. The doses not required at any time drop off the elevated portions of the ramp surfaces and back into the wells 61 of the holders 28. Thus, at all times the dispenser is operating there are doses waiting to be ejected it the corresponding solenoid is operated.

The lower end of a collector of the funnel is turned about its axis before the actual dose-loading sequence is commenced, to bring the lower end over the blister cavity which is next to be loaded. The solenoid 45 associated with each of the holders and which is required to provide doses to the blister cavity to be loaded is then operated and the correct ejection of a dose is noted by its descent through the funnel collector being detected by the sensor 53. The next dose is then ejected from its holder in corresponding manner, until the blister is fully loaded. After each blister is loaded the platen and funnel collector move to bring the next empty blister to be loaded into registration with the collector lower end.

When all the blisters have been loaded, a cover sheet is placed over the blister sheet and sealed into position to close the blister which is then in a form at which it can be given to the patient.

What is claimed is:

1. Apparatus for dispensing medication doses, comprising: a tower of dose holders placed one above the other and respectively for storing different doses which are to be dispensed; a device for vibrating the tower in a predetermined manner to move the doses in the holders towards outlets provided therein; ejectors individually associated with the holders and operable to release required doses from the outlets of the holders; an openended collector into which the doses ejected from the holders fall; a loading station disposed beneath the open lower end of the collector and for supporting a receptacle which is to be loaded with a selected number of different doses ejected from the holders; and a controller operated in accordance with a pre-determined dose-loading programme and governing the operation of the ejectors.

2. Apparatus for dispensing medication doses into a pack, comprising: a tower of separable superimposed and similar holders for respectively storing different doses which are to be dispensed; a device for vibrating the tower in a predetermined manner; a guide in each holder for responding to the vibrations of the tower by conveying the doses in the holders individually towards holder outlets having associated dose ejectors; a collector for receiving the doses ejected from the holders and discharging them towards a position at which a receptacle of a horizontally arranged array of receptacles is to be located; a support for holding the array of receptacles at a dose-loading locating; a mechanism for producing a relative horizontal displacement between the support and the discharge end of the collector to enable the individual receptacles to be loaded with the desired combinations of doses; and, a controller operated in accordance with a predetermined dose-loading program and governing the operation of the ejectors and the relative movement between the collector and the support to enable the array of receptacles to be loaded in an automated manner with the desired combinations of doses as determined by the program.

3. Apparatus as claimed in claim 1, in which each holder comprises a hollow shallow cylindrical box internally provided with an upwardly spiralling guide against its outside wall.

4. Apparatus as claimed in claim 2, in which each holder comprises a hollow shallow cylindrical box internally provided with an upwardly spiralling guide against its outside wall.

5. Apparatus as claimed in claim 1, in which each holder is equipped with its own ejector and a vertical column of actuators alongside the tower are individually operable, in sequence, to eject desired doses from the holders.

6. Apparatus as claimed in claim 2, in which each holder is equipped with its own ejector and a vertical column of actuators alongside the tower are individually operable, in sequence, to eject desired doses from the holders.

7. Apparatus as claimed in claim 1, in which detectors associated with respective actuators are connected to provide signals signifying the ejection of a desired dose from a particular holder.

8. Apparatus as claimed in claim 2, in which detectors associated with respective actuators are connected to provide signals signifying the ejection of a desired dose from a particular holder.

9. Apparatus as claimed in claim 1, in which the holders are mounted in respective compartments of an upright casing vibrated by the device.

10. Apparatus as claimed in claim 2, in which the holders are mounted in respective compartments of an upright casing vibrated by the device.

11. Apparatus as claimed in claim 9, in which the collector comprises an upright funnel extending down the side of the funnel and made up from funnel sections which are each an integral part of a respective holder.

12. Apparatus as claimed in claim 10, in which the collector comprises an upright funnel extending down the side of the funnel and made up from funnel sections which are each an integral part of a respective holder.

13. Apparatus as claimed in claim 11, in which a dose detector scans beneath the funnel and responds to the detection of a dose free-falling from the funnel by sending a signal to the controller.

14. Apparatus as claimed in claim 12, in which a dose detector scans beneath the funnel and responds to the detection of a dose free-falling from the funnel by sending a signal to the controller.

15. Apparatus as claimed in claim 13, in which each holder has an ejector built into it and which is moved by a solenoid-operated rod between a non-ejection position at which it closes a dose outlet in the holder, and an ejection position at which it opens the outlet and discharges a dose from the holder into the funnel.

16. Apparatus as claimed in claim 14, in which each holder has an ejector built into it and which is moved by a solenoid-operated rod between a non-ejection position at which it closes a dose outlet in the holder, and an ejection position at which it opens the outlet and discharges a dose from the holder into the funnel.

17. Apparatus as claimed in claim 9, in which the holders have individual bar codes identifying their contents, and a bar-code reader mounted beside the tower is vertically moveable to provide the controller with signals signifying the contents of the holders and where they are individually vertically located in the tower.

18. Apparatus as claimed in claim 10, in which the holders have individual bar codes identifying their contents, and a bar-code reader mounted beside the tower is vertically moveable to provide the controller with signals signifying the contents of the holders and where they are individually vertically located in the tower.

19. Apparatus as claimed in claim 1, in which the tower is supported at both ends to prevent it from moving conically about its axis of vibratory movement.

20. Apparatus as claimed in claim 2, in which the tower is supported at both ends to prevent it from moving conically about its axis of vibratory movement.

* * * * *